(12) United States Patent
Wakitani et al.

(10) Patent No.: US 7,696,642 B2
(45) Date of Patent: Apr. 13, 2010

(54) COGENERATION SYSTEM

(75) Inventors: Tsutomu Wakitani, Wako (JP); Yoshinori Nakagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 99 days.

(21) Appl. No.: 12/069,818

(22) Filed: Feb. 13, 2008

(65) Prior Publication Data
US 2008/0197709 A1 Aug. 21, 2008

(30) Foreign Application Priority Data
Feb. 19, 2007 (JP) ............................ 2007-038229

(51) Int. Cl.
*H02J 9/00* (2006.01)
(52) U.S. Cl. ...................................................... 307/65
(58) Field of Classification Search .................. 307/43, 307/64, 65
See application file for complete search history.

(56) References Cited

U.S. PATENT DOCUMENTS

| | | | |
|---|---|---|---|
| 5,929,538 A * | 7/1999 | O'Sullivan et al. ............ 307/66 |
| 5,969,435 A * | 10/1999 | Wilhelm ....................... 307/64 |
| 6,507,128 B2 * | 1/2003 | King et al. ................. 290/40 C |
| 6,713,890 B2 * | 3/2004 | Kondo et al. .............. 290/40 B |
| 7,177,168 B2 * | 2/2007 | Toyomura et al. ........... 363/131 |
| 7,411,308 B2 * | 8/2008 | Parmley ..................... 290/1 R |
| 2006/0202559 A1* | 9/2006 | Hashimoto et al. ............ 307/64 |

FOREIGN PATENT DOCUMENTS

JP 11-055860 2/1999

* cited by examiner

*Primary Examiner*—Albert W Paladini
*Assistant Examiner*—Michael Rutland Wallis
(74) *Attorney, Agent, or Firm*—Carrier, Blackman & Associates, P.C.; Joseph P. Carrier; William D. Blackman

(57) ABSTRACT

In a cogeneration system having a generator unit that generates DC power, an internal combustion engine for driving the generator unit, a battery that stores DC power for starting the engine, and an inverter that inverts the DC power generated by the generator unit to AC power, there are provided a solar unit that generates DC power by converting radiant energy of sunlight into electrical energy and a DC/DC converter that boosts the DC power stored in the battery, such that one of the battery and the solar unit is connected to the inverter through the DC/DC converter, thereby enabling them to share the DC/DC converter and thus to make the structure simple.

19 Claims, 2 Drawing Sheets

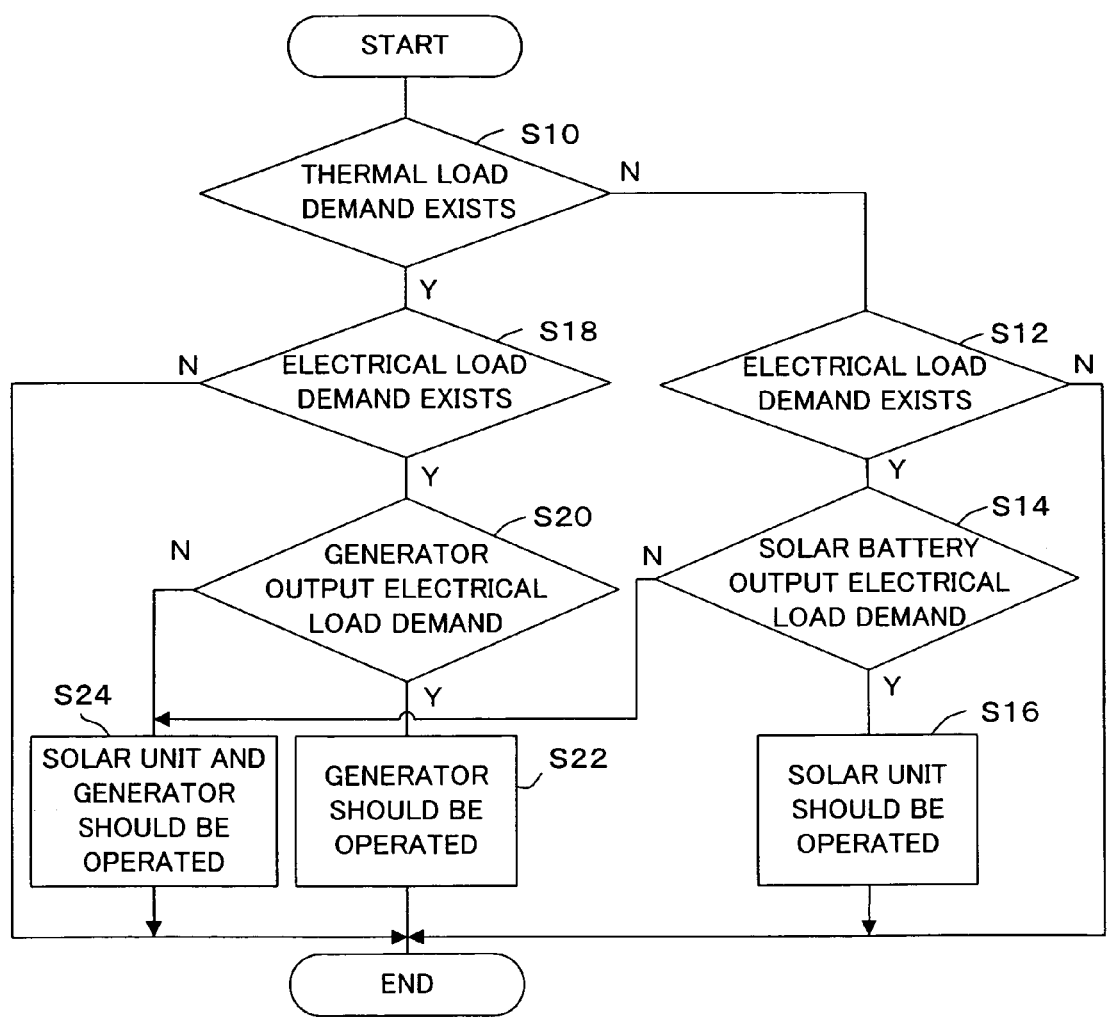

COGENERATION SYSTEM

CROSS REFERENCE TO RELATED APPLICATIONS

The present application claims priority under 35 USC 119 based on Japanese Patent Application JP2007-038229 filed on Feb. 19, 2007, the entire contents of the priority document is incorporated herein by reference.

BACKGROUND OF THE INVENTION

1. Field of the Invention

This invention relates to a cogeneration system, particularly to a cogeneration system combined with a solar electric generation system in an efficient manner.

2. Description of the Related Art

In recent years, cogeneration systems have been developed that are equipped with an internal combustion engine-driven generator for supplying power to the load and also for supplying hot water or air or the like, heated by using exhaust heat from the engine to a thermal load. Further, a cogeneration system combined with a solar electric generation system is disclosed in Japanese Laid-Open Patent Application No. Hei 11 (1999)-55860.

The cogeneration system taught in the reference includes a sunlight cogeneration system utilizing solar electric generation to generate DC power, an engine cogeneration system utilizing engine electric generation to generate DC power, and an inverter that inverts generated DC power to AC power to be supplied to electrical loads. Since the output of the sunlight cogeneration system fluctuates depending on hours of sunlight, the sunlight cogeneration output is monitored and if it drops, the engine cogeneration system is operated to increase its output.

In this system, since the sunlight cogeneration system and the engine cogeneration system are independent from each other, it is disadvantageously complicated, although they share the inverter.

SUMMARY OF THE INVENTION

An object of this invention is therefore to overcome the foregoing disadvantage by providing a cogeneration system combined with a solar electric generation system that is simplified in structure.

In order to achieve the above object, the present invention provides a cogeneration system having a generator unit that generates DC power, an internal combustion engine for driving the generator, a battery that stores DC power for starting the engine, and an inverter that inverts the DC power generated by the generator unit to AC power, such that the inverted AC power of the generator is supplied to an electrical load, while heat exhausted by the engine is supplied to a thermal load, comprising: a solar unit that generates DC power by converting radiant energy of sunlight into electrical energy; and a DC/DC converter that boosts the DC power stored in the battery, such that one of the battery and the solar unit is connected to the inverter through the DC/DC converter.

BRIEF DESCRIPTION OF THE DRAWINGS

The above and other objects and advantages of the invention will be more apparent from the following description and drawings in which:

FIG. 2 is a flowchart showing the operation of the cogeneration system illustrated in FIG. 1.

DETAILED DESCRIPTION OF THE PREFERRED EMBODIMENT

Figure 1:
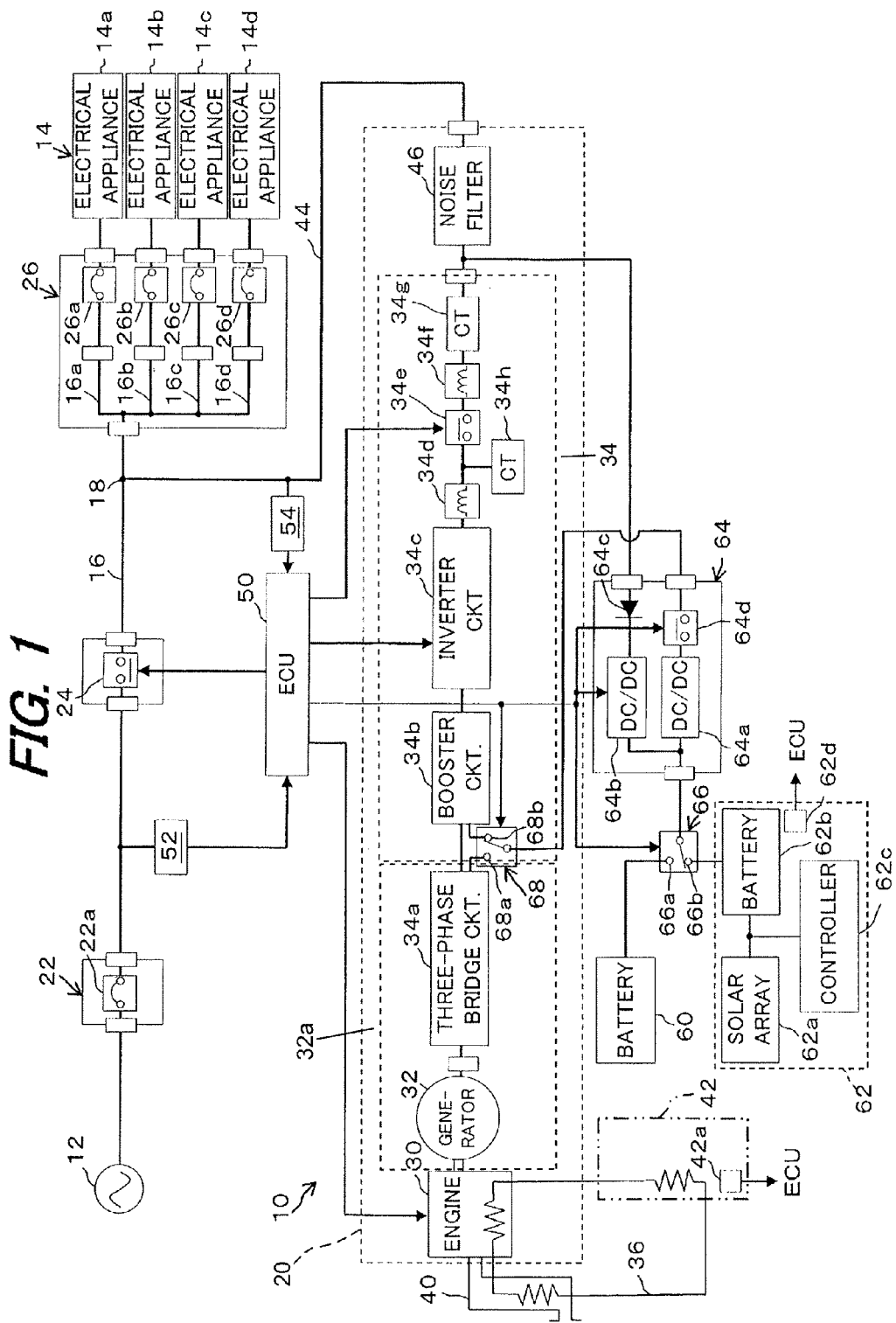
FIG. 1 is a block diagram giving an overall view of a cogeneration system according to an embodiment of this invention.

A cogeneration system according to an embodiment of the invention will now be explained with reference to the attached drawings.

FIG. 1 is a block diagram giving an overall view of a cogeneration system according to an embodiment of this invention.

As illustrated, the cogeneration system (designated by reference numeral 10) is equipped with a power plant 20 connected through a connection 18 to an AC power feed line (power line; first feed line) 16 between a commercial power network (network power) 12 and an electrical load 14. The power network 12 outputs single-phase, three-wire, 100/200 V, 50 Hz (or 60 Hz) AC power.

The power plant 20, which will be explained further below, has a relatively small output and is suitable for use at homes and the like. The electrical load 14 comprises a plurality of, specifically four electrical AC appliances 14a, 14b, 14c, 14d. Typically, 14a might be a lighting fixture, 14b a washing machine, 14c a refrigerator, and 14d an air-conditioner.

The first feed line 16 is installed with, in order from the power network 12 side (upstream side), a main breaker box 22, a switch 24 and a circuit breaker panel 26. It is connected to the electrical load 14 downstream of the panel 26. A main breaker 22a for overcurrent protection is installed in the main breaker box 22.

The switch 24 is installed in the first feed line 16 at a location upstream (on the power network 12 side) of the connection 18 with the power plant 20. When the switch 24 is turned ON, the power network 12 is connected with the electrical load 14 and the power plant 20. When it is turned OFF, the connection with the electrical load 14 and power plant 20 is broken, thereby preventing supply (reverse flow) of power from the power plant 20 to the power network 12. Under ordinary circumstances (when there has been no outage of the power network 12), the first switch 24 is kept ON.

The first feed line 16 divides into four branch lines 16a, 16b, 16c, 16d at the circuit breaker panel 26, and the four branches connect with the electrical appliances (load) 14a, 14b, 14c, 14d through associated breakers 26a, 26b, 26c, 26d. Like the aforesaid main breaker 22a, the breakers 26a to 26d open when the current exceeds predetermined values, thereby preventing the overcurrent from reaching the electrical load 14. As illustrated in FIG. 1, electrical connection with the main breaker box 22, first switch 24, circuit breaker panel 26 and the like is established through terminals (indicated by small boxes), which will not be described in detail.

The power plant 20 comprises or includes an internal combustion engine 30, generator unit 32a driven by the engine 30, and inverter 34 connected to the generator unit 32a.

The units making up the power plant 20 will now be explained.

The engine 30 is a single-cylinder, four-cycle, water-cooled, spark-ignition, OHV engine that runs on gasoline and has a displacement of, for example, 163 cc. The coolant passage (not shown) of the engine 30 is connected to piping 36 that passes through the interior of a muffler 40 of the engine 30 and then into a hot water storage tank (thermal load) 42. The coolant of the engine 30 flows through the piping 36.

The coolant heated by operation of the engine 30 is further heated while passing through the muffler 40 and is then sent to the storage tank 42 where it raises the temperature of the water stored in the tank by heat exchange. The coolant cooled by the heat exchange is returned through the upstream segment of the coolant passage to cool the engine 30. By this process, the exhaust heat of the engine 30 can be used, for example, to make hot water. The hot water stored in the storage tank 42 is supplied to a thermal load such as a hot-water supply system (not shown) for a kitchen and/or bath.

The generator unit 32a comprises a three-phase AC generator 32 that produces AC power output when its rotor (not shown) is driven by the engine 30 controlled to operate at a predetermined engine speed. The generator 32 is designed to have a maximum power output of, say, 1.0 kW. The generator unit 32a is equipped with a three-phase bridge circuit (drive circuit) 34a that converts the AC output of the generator 32 to a DC output.

The generator 32 can also function as a starter for the engine 30. The starting operation is conducted by supplying current to the stator coil (not shown) of the generator 32 so as to rotate its rotor, which is connected to the engine 30, and thereby cranking and starting the engine 30. The generator 32 is thus a starter-generator that is able to function both as a starter for the engine 30 and as a generator (alternator) that outputs AC power.

The inverter 34 is equipped with a booster circuit 34b that boosts or steps up the voltage of the DC power rectified by the three-phase bridge circuit 34a to a predetermined voltage, and an inverter circuit 34c that inverts the boosted DC power to AC, i.e., inverts it to single-phase, three-wire, 100/200 V AC power of the same frequency as that of the power supplied by the power network 12. The inverter circuit 34c is equipped with multiple switching elements constituted of insulated-gate bipolar transistors (Insulated-Gate Bipolar Transistors) whose switching action inverts DC to AC.

The inverter 34 is further equipped with a choke coil 34d that removes noise from the inverter circuit output, a second switch 34e, a common-mode coil 34f that removes noise from the second switch output, and a current sensor (current transformer (CT)) 34g that detects the current, i.e., the amperage of the common-mode coil output.

When the second switch 34e is turned ON, the inverter circuit output is supplied to the electrical load 14, and when it is turned OFF, supply of the output to the load 14 is cut off. A second current sensor 34h is connected between the choke coil 34d and the second switch 34e that produces an output indicating the amperage of the AC current at that point.

The inverter 34 is connected to the first feed line 16 through a second feed line 44 and the connection 18. The AC power outputted by the inverter 34 is therefore supplied to the electrical appliances (load) 14a, 14b, 14c, 14d through the second feed line 44, connection 18, first feed line 16 and circuit breaker panel 26 (breakers 26a to 26d). A noise filter 46 is interposed between the inverter 34 and the second feed line 44 for removing noise from the output of the inverter 34.

The cogeneration system 10 is further equipped with a microcomputer-based Electronic Control Unit (hereinafter referred to as "ECU") 50, a first current-voltage sensor 52 connected to the first feed line 16 and a second current-voltage sensor 54 connected to the second feed line 44. The first and second current-voltage sensors 52, 54 produce and send to the ECU 50 outputs or signals representing the voltage, current and phase (sine wave) of the AC power on the first and second feed lines 16, 44.

Based on the outputs from the first current-voltage sensor 52, the ECU 50 discriminates or determines whether or not the power network 12 supplies AC power through the first feed line 16, i.e., whether it operates normally or has experienced a power outage, and detects the phase and the like of the AC power when it discriminates that the power network 12 supplies AC power. Also the ECU 50 discriminates whether the power plant 20 supplies AC power, based on the outputs of the second current-voltage sensor 54.

In addition to the power plant 20, the cogeneration system 10 has a battery 60 that stores DC power, a solar electric generation unit (hereinafter referred to as "solar unit") 62, a DC/DC converter unit 64 that is connected to the battery 60 and solar unit 62 and boosts the voltage from the battery 60 and solar unit 62, and a first selector switch 66.

The battery 60 is made up of a suitable number of nickel-metal hydride (Ni-MH) voltaic cells that is connected in series and stores, for example, 12V DC power through energy exchange accompanied by redox reaction. The battery 60 is provided to start the engine 30. However, as mentioned above, since the generator 32 can function as a starter, the engine can also be started by supplying current from the power network 12 to the generator 32 when the power network 12 is normal.

The solar unit 62 comprises a solar array 62a made up of several solar cells that are connected and generate DC power by converting the radiant energy of sunlight into electrical energy, a solar battery 62b that is connected to the solar array 62a and stores the DC power generated by the solar array 62a, a charge/discharge controller 62c that controls charging and discharging between the solar array 62a and the solar battery 62b.

The capacity of the solar battery 62b is set to 12V, i.e., is set to be same as that of the battery 60. With this, it becomes possible to immediately connect the battery 60 and solar battery 62b to the DC/DC converter 64 and to share the DC/DC converter 64.

The DC/DC converter unit 64 is equipped with first and second DC/DC converters 64a, 64b that utilize the switching action of IGBTs (not shown) to step up/down the voltage of inputted power to a predetermined value, a diode 64c whose anode terminal is connected to the output side of the inverter 34 and whose cathode terminal is connected to the second DC/DC converter 64b, and a switch 64d.

The first selector switch 66 is configured to be switched between a first terminal 66a connected to the battery 60 and a second terminal 66b connected to the solar unit 62, more specifically to the solar battery 62b of the solar unit 62.

When the battery 60 or the solar battery 62b is connected to the DC/DC converter unit 64 through the first selector switch 66, the output of the battery 60 or the solar battery 62b is boosted by the first DC/DC converter 64a and is sent to the switch 64d. When the switch 64d is turned ON, the boosted output of the battery 60 or the solar battery 62b is supplied to a second selector switch 68. On the other hand, the supply of the boosted output is cut off when the switch 64d is turned OFF.

The output voltage of the DC/DC converter unit 64 is set to be higher than that of the output voltage of the booster circuit 34b of the inverter 34. Specifically, for example, when the output of the solar battery 62b is 0.8 kW, that of the inverter 34 is 0.8 kW, and the power consumption of the electrical load 14 (electrical appliances 14a to 14d) is 1.2 kW, the output voltage of the DC/DC converter unit 64 is set to DC 240 V, while the output voltage of the booster circuit 34*b* is set to DC 230 V.

With this, when the power network 12 breaks down or when the power supply from the power network 12 is blocked off by turning the switch 24 OFF, it becomes possible to discharge, run down or wear out the output of the solar battery 62*b* first and then to fill up with supplementary power of 0.4 kW from the inverter 34.

The second selector switch 68 is configured to be switched between a first terminal 68*a* connected to the three-phase bridge circuit 34*a* and a second terminal 68*b* connected to the booster circuit 34*b*. When the switch 64*d* of the DC/DC converter unit 64 is turned ON, the output of the battery 60 or the solar battery 62*b* boosted by the first DC/DC converter 64*a* of the DC/DC converter unit 64 is connected to the three-phase bridge circuit 34*a* of the inverter 34 if the second selector switch 68 is switched to the first terminal 68*a*, and is connected to the booster circuit 34*b* if the second selector switch 68 is switched to the second terminal 68*b*.

Under a predetermined operating state, the AC power output by the inverter 34 is converted to DC by the diode 64*c* and sent to the second DC/DC converter 64*b* to be suitably lowered in voltage and then supplied to the battery 60 as charging current.

A voltage sensor 62*d* is installed in the solar unit 62 that produces an output or signal indicative of the output voltage of the solar battery 62*b*. A temperature sensor 42*a* is installed in the storage tank 42 that produces an output or signal indicative of the temperature of the water stored in the tank 42. The ECU 50 turns ON/OFF (operates) the switches 62, 64*d*, 68.

FIG. 2 is a flowchart showing the operation of the cogeneration system 10, more specifically the sequence of operations of the ECU 50.

The processing in the flowchart is based on a situation where the power network 12 breaks down or the switch 24 is turned OFF to block off the power supply from the power network 12 (i.e., the cogeneration system 10 is operated independently).

First, in S10, it is determined whether thermal load demand exists. This is done based on the output of the temperature sensor 42*a* installed in the storage tank 42. When the detected temperature is less than a predetermined temperature, it is determined that thermal load demand exists, since it is necessary to raise the temperature. When the detected temperature is equal to or greater than the predetermined temperature, it is determined that no thermal load demand exists, since it is not necessary to raise the temperature.

When the result in S10 is NO, the program to S12, in which it is determined whether electrical load demand exists. This is done based on the output of the second current-voltage sensor 54 installed in the second feed line 44.

Specifically, power consumption of the electrical load 14, i.e., power consumption of the electrical appliances 14*a* to 14*d* is calculated from the output of the sensor 54. It is determined that electrical load demand exists if the calculated power consumption is equal to or greater than a predetermined value, while no electrical load demand exists if the calculated power consumption is less than the predetermined value. When the result in S12 is NO, the program is terminated since neither thermal load demand nor electrical load demand exists.

When the result in S12 is YES, the program proceeds to S14, in which it is determined whether the output of the solar battery 62*b* is equal to or greater than the electrical load demand, in other words it is determined whether the solar unit 62 can cover the electrical load demand.

This is done by first determining whether the DC power stored in the solar battery 62*b* is kept at the predetermined value of 12 V from the output of the voltage sensor 62*d* and whether the DC/DC converter unit 64 can produce the predetermined value of 240 V. When these determinations are all affirmative, then it is determined whether the power consumption of the electrical load 14 calculated in S12 is equal to or less than the predetermined value of 240 V.

When the result in S14 is YES, the program proceeds to S16, in which it is determined that only the solar unit 62 should be operated, i.e., it is determined that only the output of the solar unit 62 should be supplied to the electrical load 14.

Specifically, the switches 66, 64*d*, 68 are operated such that the output of the solar battery 62*b* of the solar unit 62 is connected to the DC/DC converter unit 64 and the battery output boosted by the DC/DC converter unit 64 (more precisely boosted by the first DC/DC converter 64*a*) is supplied to the inverter circuit 34*c* of the inverter 34, via the booster circuit 34*b*.

As a result, only the output of the solar unit 62 is supplied to the electrical load 14 through the second feed line 44. Although the solar unit 62 can only generate DC power and cannot exhaust heat, it poses no problem since there exists no thermal load demand in the storage tank (thermal load) 42.

On the other hand, when the result in S10 is YES, the program proceeds to S18, in which it is determined whether the electrical load demand exists in the same manner as that in S12. When the result in S18 is NO, the program is terminated since thermal load demand exists but no electrical load demand exists.

When the result in S18 is YES, the program proceeds to S20, in which it is determined whether the maximum output of the generator 32 is equal to or greater than the power consumption of the electrical load 14 detected in S18, in other words it is determined whether the power consumption of the electrical load 14 is equal to or less than the predetermined value of 230 V.

When the result in S20 is YES, the program proceeds to S22, in which it is determined that only the generator 32 should be operated. Specifically, the switch 64*d* is turned OFF and the connection between the DC/DC converter unit 64 and the inverter 34 is blocked off. With this, only the output of the generator 32 is supplied to the electrical load 14 through the second feed line 44 and heat exhausted by the engine 30 is supplied to the storage tank 42.

When the result in S20 is NO, the program proceeds to S24, in which it is determined that both of the solar unit 62 and generator 32 should be operated. This is the same when the result in S14 is NO.

In this case, the switches 66, 64*d*, 68 are operated such that the output of the solar battery 62*b* of the solar unit 62 is connected to the DC/DC converter unit 64 and the battery output boosted by the DC/DC converter unit 64 is supplied to the inverter circuit 34*c* of the inverter 34, via the booster circuit 34*b*. As a result, the outputs of the solar unit 62 and generator 32 are supplied to the electrical load 14 through the second feed line 44. At the same time, heat exhausted by the engine 30 is supplied to the storage tank 42.

As mentioned above, since the output voltage of the DC/DC converter unit 64 is set to, e.g., DC 240 V, and the output voltage of the booster circuit 34*b* of the inverter 34 is set to, e.g., DC 230 V, in other words, the output voltage of the DC/DC converter unit 64 is set to be higher than that of the output voltage of the booster circuit 34*b*, it becomes possible to run down, discharge or wear out the output of the solar battery 62*b* first and then to fill up or recharge with supplementary power from the output of the inverter 34. Thus, it becomes possible to improve the total economical efficiency of the cogeneration system, by giving priority for the use of solar unit 62 which is superior to the generator 32 in economical efficiency.

The embodiment is configured to have a cogeneration system (10) having a generator (32) that generates DC power, an internal combustion engine (30) for driving the generator, a battery (60) that stores DC power for starting the engine, and an inverter (34) that inverts the DC power generated by the generator to AC power, such that the inverted AC power of the generator is supplied to an electrical load (14), while heat exhausted by the engine is supplied to a thermal load (42), comprising: a solar unit (solar electric generation unit) (62) that generates DC power by converting radiant energy of sunlight into electrical energy; a (first) DC/DC converter (64a) that boosts the DC power stored in the battery, such that one of the battery (60) and the solar unit (62) is connected to the inverter through the DC/DC converter. With this, it becomes possible to share the DC/DC converter 64a for the battery 60 and solar unit 62, thereby simplifying the structure.

The system further includes: a selector (ECU 50, S10 to S24) that selects one of the DC power generated by the solar unit (62) and the generator (32) to be connected to the inverter (34) in response to thermal load demand and electrical load demand. With this, it becomes possible to select the solar unit 62 that is superior to the generator 32 in economical efficiency and enhance the economical efficiency of the system.

In the system, the selector selects the solar unit (62) when thermal load demand does not exist, but electrical load demand exists (S10, S12, S16).

In the system, the selector selects the solar unit (62) when the output of the solar unit is equal to or greater than the electrical load demand (S10, S12, S14, S16).

In the system, the inverter (34) includes: a booster circuit (34b) that boosts DC power generated by the generator; and an inverter circuit (34c) that inverts the boosted DC power to AC power; and output voltage of the DC/DC converter (64a) is set to be higher than that of the booster circuit (34b). With this, the solar unit is more likely to be selected and enhance the economical efficiency of the system.

In the system, the solar unit (62) includes: a solar array (62a) made up of solar cells that generate the DC power by converting the radiant energy of sunlight into electrical energy; a solar battery (62b) connected to the solar array to store the DC power generated by the solar array; and a controller (62c) that controls charging and discharging between the solar array and the solar battery.

In the system, capacity of the solar battery (62b) is set to be same as that of the battery (60). With this, it becomes easy to connect the solar unit 62, more precisely the solar battery 62b and the battery 60 to the DC/DC converter 64a to share it.

In the system, the generator (32) is connected to an AC power feed line (16) between a commercial power network (12) and the electrical load (14).

It should be noted that although it is determined that only the generator 32 should be operated when the maximum output of the generator 32 is equal to or greater than the power consumption of the electrical load 14 (in S20, S22), it is alternatively possible to remove S20 and to amend the routine such that the program proceeds to S24 when the result in S18 is YES. With this, it becomes possible to increase the chance to give the priority to the solar unit 62 and further enhance the economical efficiency.

It should also be noted that although the processing of the flowchart is based on a situation where the connection to the power network 12 is broken, it is possible to change the processing of the flowchart to give the priority to the solar unit 62 even when the connection to the power network 12 is not broken.

It should still be noted that although the embodiment of the cogeneration system uses the exhaust heat of the engine 30 to make hot water, it is possible instead to use it to make hot air for air conditioning.

It should yet still be noted that although the embodiment of the cogeneration system set out in the foregoing is configured to utilize an engine that runs on gasoline fuel as the prime mover (engine 30) for operating the power plant 20, it is possible instead to adopt a configuration that, for example, uses a gas engine that runs on natural gas or liquid propane gas.

It should yet still be noted that although the embodiment of the cogeneration system set out in the foregoing is explained as using AC power of 100/200 V output by the power network 12, it goes without saying that if the voltage of the AC power output by the power network exceeds 100/200 V, the power plant 20 is configured to produce an output of corresponding voltage.

It should yet still be noted that although concrete values are given for the maximum power output of the generator 32 and the displacement etc. of the engine 30, the values given are merely examples and are not to be construed as placing any limit whatsoever on the invention.

While the invention has thus been shown and described with reference to specific embodiments, it should be noted that the invention is in no way limited to the details of the described arrangements; changes and modifications may be made without departing from the scope of the appended claims.

What is claimed is:

1. A cogeneration system having a generator unit that generates DC power, an internal combustion engine for driving the generator unit, a battery that stores DC power for starting the engine, and an inverter that inverts the DC power generated by the generator unit to AC power, such that the inverted AC power of the generator unit is supplied to an electrical load, while heat exhausted by the engine is supplied to a thermal load, said cogeneration system comprising:
   a solar unit that generates DC power by converting radiant energy of sunlight into electrical energy;
   a DC/DC converter that boosts the DC power stored in the battery, and
   a switch for selectively choosing one of the battery and the solar unit to be connected to the inverter through the DC/DC converter further including: a selector that selects one of the DC power generated by the solar unit and the generator unit to be connected to the inverter in response to thermal load demand and electrical load demand.

2. The system according to claim 1, wherein the selector selects the solar unit when thermal load demand does not exist, but electrical load demand exists.

3. The system according to claim 2, wherein the selector selects the solar unit when the output of the solar unit is equal to or greater than the electrical load demand.

4. The system according to claim 1, wherein the inverter includes:
   a booster circuit that boosts the DC power generated by the generator unit; and
   an inverter circuit that inverts the boosted DC power to AC power;
   and output voltage of the DC/DC converter is set to be higher than that of the booster circuit.

5. The system according to claim 1, wherein the solar unit includes:
   a solar array made up of solar cells that generate the DC power by converting the radiant energy of sunlight into electrical energy;
   a solar battery connected to the solar array to store the DC power generated by the solar array; and
   a controller that controls charging and discharging between the solar array and the solar battery.

6. The system according to claim 5, wherein capacity of the solar battery is set to be same as that of the battery.

7. The system according to claim 1, wherein the generator unit is connected to an AC power feed line between a commercial power network and the electrical load.

8. The system according to claim 1, wherein the generator unit comprises:
   a three-phase AC generator that produces an AC power output, and
   a drive circuit that converts the AC output of the generator to a DC output.

9. The system according to claim 1, wherein the generator unit comprises:
   a three-phase AC generator that produces an AC power output, and
   a drive circuit that converts the AC output of the generator to a DC output.

10. A cogeneration system for generating power, comprising:
    an internal combustion engine for driving a generator unit, said generator unit, comprising:
      a generator for generating AC power; and
      a drive circuit for converting the AC power supplied by the generator to DC power;
    a first battery that stores DC power for starting the engine,
    an inverter that inverts DC power generated by the generator unit to AC power,
    a solar generation unit that generates DC power by converting radiant energy into electrical energy, said solar generation unit comprising:
      a solar array made up of solar cells that generate DC power;
      a second battery connected to said solar array; and
      a controller for controlling charging and discharging between said solar array and said second battery;
    a DC/DC converter unit for boosting the DC power stored in said first battery or generated by said solar generation unit, such that one of the first battery and the solar generating unit is connected to the inverter through the DC/DC converter;
    a selector for determining the selection of power generated by the solar generating unit or the generator unit based on the thermal load demand and an electrical load demand.

11. The system of claim 10, wherein the system further includes a control unit including first and second current voltage sensors, and based on said first and second current voltage sensors outputs, determines whether or not the system supplies power due to a power outage.

12. The system of claim 10, wherein the DC/DC converter unit comprises first and second DC/DC converters to step up/down the inputted power to a predetermined value.

13. The system according to claim 10, wherein the selector selects the solar generating unit when thermal load demand does not exist, but electrical load demand exists.

14. The system according to claim 10, wherein the selector selects the solar unit when the output of the solar generating unit is equal to or greater than the electrical load demand.

15. The system according to claim 10, wherein the inverter includes:
    a booster circuit that boosts the DC power generated by the generator; and
    an inverter circuit that inverts the boosted DC power to AC power;
    and output voltage of the DC/DC converter is set to be higher than that of the booster circuit.

16. The system according to claim 10, wherein capacity of the solar battery is set to be same as that of the battery.

17. The system according to claim 10, wherein the generator is connected to an AC power feed line between a commercial power network and the electrical load.

18. The system according to claim 10, wherein the selector comprises:
    a first switch, said first switch configured to be switched between a first terminal connected to said first battery and a second terminal connected to said solar generation unit;
    a second switch, said second switch connected between said DC/DC converter and said inverter and configured to selectively actuate and de-actuate power from said DC/DC converter to said inverter; and
    a third switch, said third switch configured to be switched between a first terminal connected to said drive circuit and a second terminal connected to said inverter;
    wherein when said second switch is configured to actuate power from said DC/DC converter to said inverter, the output of said first battery or said solar generation unit boosted by said DC/DC converter is connected to said drive circuit if the third switch is switched to said first terminal of said third switch and is connected to said inverter if said third switch is switched to said second terminal of said third switch.

19. The system according to claim 18, further comprising a controller, wherein the system is configured and arranged such that during operation thereof
    when it is determined that no thermal load demand exists, but that an electrical load demand exists, and that the output of the solar generation unit is equal to or greater than the electrical load demand, the controller operates said first, second and third switches such that only the output of the solar generation unit is connected to said DC/DC converter and supplied to said inverter,
    when it is determined that a thermal load demand exists, that an electrical load demand exists, and that a maximum output of the generator unit is equal to or greater than the power consumption of the electrical load, the controller deactivates said second switch such that connection between said DC/DC converter is blocked, and only the output of said generator unit is supplied to said inverter, and
    when it is determined that a thermal load demand exists, and that an electrical load demand exists, but that the maximum output of the generator unit is less than the power consumption of the electrical load, the controller operates said first, second and third switches such that the output of the solar generation unit and the output of said generator unit are connected to said DC/DC converter and supplied to said inverter.

* * * * *